US008887082B2

(12) United States Patent
Li

(10) Patent No.: US 8,887,082 B2
(45) Date of Patent: Nov. 11, 2014

(54) METHOD AND SYSTEM FOR REALIZING MESSAGE INTERACTIONS IN A MULTI-TABS APPLICATION

(75) Inventor: Zituo Li, Beijing (CN)

(73) Assignee: Beijing Sogou Technology Development Co., Ltd., Beijing (CN)

( * ) Notice: Subject to any disclaimer, the term of this patent is extended or adjusted under 35 U.S.C. 154(b) by 179 days.

(21) Appl. No.: 13/186,573

(22) Filed: Jul. 20, 2011

(65) Prior Publication Data

US 2011/0276899 A1 Nov. 10, 2011

Related U.S. Application Data

(63) Continuation of application No. PCT/CN2010/070326, filed on Jan. 22, 2010.

(30) Foreign Application Priority Data

Jan. 23, 2009 (CN) .......................... 2009 1 0077869

(51) Int. Cl.
G06F 3/0483 (2013.01)
G06Q 10/10 (2012.01)
G06F 17/30 (2006.01)
G06F 9/44 (2006.01)

(52) U.S. Cl.
CPC ........ G06Q 10/107 (2013.01); G06F 17/30899 (2013.01); G06F 9/4443 (2013.01)
USPC ....................................................... 715/777

(58) Field of Classification Search
USPC ....................................................... 715/752
See application file for complete search history.

(56) References Cited

U.S. PATENT DOCUMENTS

| 6,049,812 | A  | * | 4/2000 | Bertram et al. | ............... 715/205 |
| 6,232,971 | B1 | * | 5/2001 | Haynes | ......................... 715/800 |
| 6,356,908 | B1 | * | 3/2002 | Brown et al. | .......................... 1/1 |
| 6,489,975 | B1 | * | 12/2002 | Patil et al. | ..................... 715/781 |
| 6,981,223 | B2 | * | 12/2005 | Becker et al. | ................. 715/753 |
| 7,177,815 | B2 | * | 2/2007 | Ehlen et al. | ................ 704/270.1 |

(Continued)

FOREIGN PATENT DOCUMENTS

| CN | 200710090660.3 | 11/2007 |
| CN | 200710160610.8 | 5/2008 |
| CN | 200810126823.3 | 11/2008 |
| WO | WO03040955 A1 | 5/2003 |

OTHER PUBLICATIONS

Microsoft MSDN, IE8 and Loosely-coupled IE, IE8 Tab Grouping, Mar. 11, 2008, Sep. 30, 2008, pp. 1-14, 1-18.*

*Primary Examiner* — Phenuel Salomon
(74) *Attorney, Agent, or Firm* — Anova Law Group, PLLC

(57) ABSTRACT

A method is disclosed for performing message interactions in a multi-tab application program. The method includes creating one or more page windows corresponding to respective tabs in the multi-tab application program as one or more top-level windows and receiving an input message corresponding to a user operation with respect to a particular tab. The method also includes sending the input message to one of the page windows corresponding to the particular tab by a main frame window of the multi-tab application program in a non-blocking message sending mode, without sending any associated system message to the page windows. Further, the method includes continuing to handle messages for other page windows by the main frame window regardless whether the one of the page windows is hung.

18 Claims, 6 Drawing Sheets

(56) References Cited

U.S. PATENT DOCUMENTS

| | | | |
|---|---|---|---|
| 7,299,474 B2* | 11/2007 | Adams et al. | 719/310 |
| 7,523,409 B2* | 4/2009 | Yolleck et al. | 715/777 |
| 7,596,760 B2* | 9/2009 | Sauve et al. | 715/777 |
| 7,673,255 B2* | 3/2010 | Schechter et al. | 715/838 |
| 2002/0093537 A1* | 7/2002 | Bocioned et al. | 345/777 |
| 2003/0097640 A1* | 5/2003 | Abrams et al. | 715/530 |
| 2006/0271858 A1* | 11/2006 | Yolleck et al. | 715/738 |
| 2007/0073697 A1* | 3/2007 | Woods | 707/9 |
| 2008/0005686 A1* | 1/2008 | Singh | 715/764 |
| 2008/0040682 A1* | 2/2008 | Sorenson et al. | 715/777 |
| 2008/0184138 A1* | 7/2008 | Krzanowski et al. | 715/760 |
| 2008/0282179 A1* | 11/2008 | Kim et al. | 715/769 |
| 2009/0193358 A1* | 7/2009 | Mernyk et al. | 715/804 |
| 2009/0287559 A1* | 11/2009 | Chen et al. | 705/14.23 |
| 2009/0327947 A1* | 12/2009 | Schreiner et al. | 715/777 |
| 2010/0107115 A1* | 4/2010 | Sareen et al. | 715/783 |

* cited by examiner

METHOD AND SYSTEM FOR REALIZING MESSAGE INTERACTIONS IN A MULTI-TABS APPLICATION

CROSS-REFERENCES TO RELATED APPLICATIONS

This application claims the priority of PCT patent application no. PCT/CN2010/070326, filed on Jan. 22, 2010, which claims the priority of Chinese patent application no. 200910077869.5, filed on Jan. 23, 2009, the entire contents of all of which are incorporated herein by reference.

FIELD OF THE INVENTION

The present invention relates to the field of multi-tab application programming and, more particularly, relates to methods and systems for message interactions in a multi-tab application program.

BACKGROUND

A browser is often the most commonly-used entrance for users to access the Internet. In many cases, the users hope to be able to pay attention to many web pages at the same time. Because the size of a display screen is limited, multi-tab browsers are developed, as shown in FIG. 1. In this multi-tab browser, each tab corresponds to a web page, and a user can focus on contents of only one web page at a particular time. However, when the user wants to focus on contents of other web pages, the user only needs to switch the tabs.

Although this type of multi-tab browser can provide convenience for the user to view the web pages, one condition called page hanging (i.e., the user cannot operate on a web page, such as scroll the pages or click on the links, etc.) spreading often occurs. That is, when a single page window is hung, the other page windows are also in a hanging state following that single page window's hanging. For example, if a user opens ten (10) web pages and the current page is Sohu home page, assuming that, when the user is browsing the current page, the current page is suddenly hung, then the user cannot operate on the other nine (9) web pages (i.e., the page window hanging spreading). At this point, the user has to cancel browsing the other nine pages, ends the browsing process, restarts the browser, and re-opens the nine web pages in order to continue browsing these pages.

The disclosed methods and systems are directed to solve one or more problems set forth above and other problems.

BRIEF SUMMARY OF THE DISCLOSURE

One aspect of the present disclosure includes a method for performing message interactions in a multi-tab application program. The method includes creating one or more page windows corresponding to respective tabs in the multi-tab application program as one or more top-level windows and receiving an input message corresponding to a user operation with respect to a particular tab. The method also includes sending the input message to one of the page windows corresponding to the particular tab by a main frame window of the multi-tab application program in a non-blocking message sending mode without sending any associated system message to the page windows. Further, the method includes continuing to handle messages for other page windows by the main frame window regardless whether the one of the page windows is hung.

Another aspect of the present disclosure includes a computer-readable medium containing executable computer programs. When executed by a computer, the executable computer programs perform a method for performing message interactions in a multi-tab application program. The method includes creating one or more page windows corresponding to respective tabs in the multi-tab application program as one or more top-level windows and receiving an input message corresponding to a user operation with respect to a particular tab. The method also includes sending the input message to one of the page windows corresponding to the particular tab by a main frame window of the multi-tab application program in a non-blocking message sending mode without sending any associated system message to the page windows. Further, the method includes continuing to handle messages for other page windows by the main frame window regardless whether the one of the page windows is hung.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

A user often uses a computer to access contents locally stored or over the Internet using window-based interfaces. A window, as described in the embodiments of the present invention, refers to an area of a system display. An application program uses the window to display outputs and/or to receive inputs from the user. Of course, the "window" as used herein is not limited to Windows and other traditional window-based operating systems. Even in non-Windows operating systems, as long as a human-computer interaction (HCI) interface (such as a dialog box, etc.) is provided on the computer interface, it can be regarded as the window as described in the embodiments of the present invention.

On one hand, the application program accesses the system display through the window. On the other hand, the application program shares the system display with other application programs using the window. Because only one window can receive user inputs at any given time, the user can interact with the windows and the application programs owning the windows through mouse, keyboard and other input devices.

Figure 1:
FIG. 1 illustrates an interface of a conventional multi-tab browser.

To enable the user to view different windows in a browser, the so-called multi-tab application program integrates different page windows corresponding to respective different multiple tabs to be displayed in a single window, and switches between different pages when the tabs are clicked upon. For example, the web page browser shown in FIG. 1 shows an interface of a conventional multi-tab web browser that can include multiple tabs at the same time and thus is called a multi-tab web browser. More specifically, small rectangular boxes labeled as "遨游起始页 (Tour Start Page)," "搜狐-中国 . . . (Sohu-China . . . )," and "空白页 (Blank Page)," are tabs of individual web pages, and each tab corresponds to a web page window.

Further, the multi-tab application programs as described herein include, but not limited to, multi-tab web browsers, multi-tab document editors (e.g., excel, etc.), and multi-tab document readers, etc. That is, a multi-tab application program may include any multi-task application, each task may be represented by a 'tab' or any other means of identification. In addition, an application program can be a single-process application program or a multi-process application program, and the page windows corresponding to the individual tabs can be created in a single process or can be created in multiple processes. However, whether being created in a single process or in multiple processes, the page windows may all have the hanging spreading problem.

The Windows family operating system is used here as an example. In the Windows operating system (also including other window-based graphical operating systems, such as Mac-specific operating system, mac, etc.), every graphical-interface-based application program needs to create at least one window, which is called a main frame window. This window is the main interface between the user and the application program. Many application programs may directly or indirectly create some other windows to complete related tasks. Once a window is created, the Windows system will be able to provide the window with corresponding user interaction messages. The Windows system can automatically complete many tasks requested by the user, such as moving the window, adjusting the window size, etc. In the Windows environment, any number of windows can be created. The Windows can display information in a variety of ways and is responsible for managing display screen and controlling the position and display of the windows to ensure that no two application programs compete for the same part of the system display at the same time.

An application program window generally comprises of a title bar, menu bars, toolbars, borders, client areas, scroll bars and other components. The relationship among multiple windows is normally a tree-based connection relationship, i.e., one window may have 0, 1, or 2 or more child windows, while each child window can only have one fixed parent window.

Still using the Windows operating system as an example, running a Windows application program is event-driven, i.e., relying on external events to drive the execution of the application program. The information describing the external events is called messages. For example, when the user presses a key on the keyboard, the system will generate a specific message indicating an occurrence of the keyboard-being-pressed event. The so-called event-driven requires that the execution order of a Windows application program depends on the order of the occurrences of the events, and thus the design of event-driven programs is centered on generating and handling the messages. During execution, a Windows application program continuously receives any possible input messages, makes a decision, and then performs appropriate processing.

The application program can receive various messages, including input messages generated by hardware devices and system messages from the Windows operating system. The application program can receive inputs from the input messages. For example, mouse movement or keyboard being pressed can generate input messages. The Windows system is responsible for monitoring all input devices and placing the input messages into a queue, which is a system-defined memory block for temporarily storing the messages, so-called the system message queue. Each graphics device interface (GDI) thread running in the Windows system has its own message queue.

When the user moves the mouse or presses the keyboard, the resulting input messages are first placed into the system message queue. Then, the Windows system removes one input message each time from the system message queue, determines a destination window for the removed input message, and sends the removed input message into a message queue of the application program that created the destination window.

An application program may receive inputs by an application program queue. The application program may use a control structure called a message loop to search messages from the application program queue and sends the searched message to a corresponding window. The corresponding window may have a window function and the window function of the corresponding window is then responsible for checking the message and performing appropriate processing.

Further, system messages are different from input messages. The Windows system directly sends a system message to the appropriate window function, instead of sending through the system message queue and the application program queue. In this way, the Windows system directly notifies a particular window of an event affecting the particular window. For example, when the user activates an application program window, the Windows system will send corresponding system messages directly to the activated window.

When a message is sent to a destination window, in general, the message can be sent in two modes: a blocking mode (such as 'SendMessage,' etc.) and a non-blocking mode (such as 'PostMessage,' PostThreadMessag; 'SendMessageCallback,' 'SendNotifyMessage,' and 'SendMessageTimeout,' etc.). Those skilled in the art normally refer 'SendMessage' as a synchronous message sending method; refer 'PostMessage,' 'PostThreadMessage,' 'SendMessageCallback,' and 'SendNotifyMessage' as asynchronous message sending methods, and refer 'SendMessageTimeout' as a synchronous message sending method with a timeout mechanism.

The message may be sent to the destination window by a separate program thread, i.e., the destination window does not belong to the program thread. Whether a window belongs to a thread is determined by whether the window was created in the thread. If the window was created in the thread, the window belongs to the thread. Otherwise, the window does not belong to the thread.

For example, assuming that a window B does not belong to a thread A, when thread A sends a message M to window B, thread A may send the message M to window B in either the blocking mode or the non-blocking mode.

If thread A sends message M to the window B in the blocking mode, thread A must wait until the window B completes processing the message M before thread A can continue to run. When the window B is processing the message M, any problem such as an infinite loop or a deadlock, etc., happened during the process may prevent the message processing from returning. At this point, the window B is considered as being hung, then thread A cannot continue to run or to receive and process other messages. Thus, the hanging of the window B can directly cause the hanging of the thread A, and all windows in thread A are hung afterwards.

If the message is sent in a non-blocking mode, the thread A can return immediately after sending the message to window B, without the need to wait until the window B completes processing the message M (if using 'PostMessage' and other asynchronous methods, there is no need to wait; if using 'SendMessageTimeout,' a waiting time threshold can be preset, and if the thread A wait for a time period longer than the preset threshold, thread A can stop waiting and return to handle other messages). Thus, if the window B is hung, thread A can continue to run.

In addition, if the window B belongs to thread A (i.e., window B was created in thread A), then window B's hanging will spread regardless whether the message is sent in the blocking mode or the non-blocking mode. That is, the hanging of the window B will always affect thread A, and window characteristics of window B cannot change that.

The message sending mode of a particular message is determined by the application program or by the operating system. For example, the message sending mode for the input messages is usually determined by the application program (usually set to the non-blocking mode); while the sending mode for system messages is generally determined by the operating system. Using the Windows operating system as an example, the Windows operating system sends system messages in the blocking mode (normally using the 'SendMessage').

For example, assuming that the window B has been hung, if the thread A sends an input message to the window B in the non-blocking mode (as determined by the application program thread A), execution of the thread A will not be affected (only that the message is not processed in time). But if the thread A sends a system message to the window B (the system message is typically sent in the blocking mode as determined by the Windows system), then the thread A will be hung following the hanging of window B. Because these system messages are implemented within the Windows system, the spreading of page window hanging cannot be prevented by modifying third-party application programs (such as browsers).

Further, in a multi-tab application program (e.g., a multi-tab browser), multiple windows are involved in receiving and processing various user inputs. Such message interactions involving multiple windows in the multi-tab application program may cause window hanging spreading depending on message sending modes and window structures.

As previously explained, an application program window generally comprises of a title bar, menu bars, toolbars, borders, client areas, scroll bars and other components. A multi-tab application program can create multiple windows corresponding to the multiple tabs. The relationship among multiple windows is normally a tree-based connection relationship, i.e., one window may have 0, 1, or 2 or more child windows, while each child window can only have one fixed parent window. If a particular window does not have a parent window or is a desktop window (a window with a window class of #32769 is called a desktop window), this particular window is called a top-level window. The hierarchy of the various windows of an application program is also called the window structure of the application program.

Figure 3:
FIG. 3 illustrates a diagram of a window structure of a multi-tab browser.

For example, FIG. 3 shows the window structure of the Yaoyou browser browsing the same web page as in FIG. 1. As shown in FIG. 3, "Maxthon2_View" is the window for displaying web page contents, and is simply called the page window. It should be noted that, Maxthon2_View is just a container window, it also has other child windows, such as the Internet Explorer_Server (not shown), etc., used to display the web page contents. Because three (3) web pages are currently opened, there are three Maxthon2_View page windows in the window structure, and all of these three page windows have the "Afx:400000:2008:10011:0:0" window as the parent window. That is, the multi-tab web page browser has all of the page windows corresponding to different tabs inherit from a same parent window.

In other words, each tab corresponds to a web page, and each web page is managed by a group of windows (referring to "Maxthon2_View" and its child windows (not shown) under the '+' sign in front of "Maxthon2_View" in the window structure chart). The group of child windows have a parent window (i.e., "Maxthon2_View"), and their parent window (i.e., "Maxthon2_View") also has a parent window (i.e., the "Afx:400000:2008:10011:0:0" in the above window structure).

In this window structure, when a user wants to perform a certain operation on a page corresponding to a tab (such as a web page zoom operation), the user first clicks the zoom button. The window containing this button then notifies the main frame window with a message of being clicked. The main frame window finds the page window corresponding to the currently-displayed tab, and sends a zoom operation message to the page window. The page window then receives the message and performs the zoom operation.

At the same time, because of the Windows operating system, certain system messages may be exchanged between windows. For example, a parent window has one or more child windows, and when the parent window has focus (for example, the main frame window of the browser becomes the current active window by certain operation), the Windows system sends a "WM_CHILDACTIVATE" message in the blocking mode. These system messages are sent by the Windows operating system in the blocking mode. Thus, only after all messages have been responded to, the operation on the page window can be completed.

For example, in the window structure shown in FIG. 3 (for clarity, "05B6," "070C," and "0774" are used to respectively represent page windows "Window 004705B6""Maxthon2_View," "Window 0060070C""Maxthon2_View", and "Window 00270774""Maxthon2_View"), assuming that the window corresponding to the currently-displayed tab is "05B6" and the user clicked the zoom button, when the main frame window "Maxthon2_Fram" sends the zoom operation message to "05B6" page window, the parent window of the "05B6" page window "Afx: 400000:2008:10011:0:0" needs to send a system message(s) to each of its child windows (e.g., "05B6," "070C," and "0774") in the blocking mode. Further, only after all the system messages are responded, the zoom operation on the page window "05B6" can be completed.

At this point, if the currently-displayed "05B6" is hung, when the user wants to operate on the "0700," the parent window "Afx:400000:2008: 10011:0:0" of the page window "070C" still needs to send system messages to each of its child windows (e.g., "05B6", "070C" and "0774") in the blocking mode. However, because the "05B6" is hung, "05B6" cannot respond after the parent "Afx:400000:2008: 10011:0:0" sends the system messages to the "05B6." Thus, the parent window "Afx: 400000:2008:10011:0:0" is forever in a waiting state, and the operation to the "070C" cannot be completed. In order to complete the operation on the "070C,"

the parent window "Afx:400000:2008:10011:0:0" also needs to send system messages to each of its child windows including the "070C."

However, because the hung "05B6" could not respond to the parent window "Afx:400000:2008:10011:0:0" and, due to the blocking mode, parent window "Afx:400000:2008:10011:0:0" cannot perform other operations until receiving a response from the page window "05B6," the parent window "Afx:400000:2008:10011:0:0" cannot complete sending system messages to all child windows in order to complete the user operation on the "070C."

Thus, the user operation on the "070C" is forever in a waiting state, and the "070C" can no longer respond to system messages. Similarly, any operation to the "0774" cannot be completed as well. That is, based on the parent-child relationship between window "Afx:400000:2008:10011:0:0" and page windows "05B6," "070C," and "0774," completing any operation on a page window requires the parent window "Afx:400000:2008:10011:0:0" to send system messages to each of its child windows in the blocking mode. Therefore, hanging of any of the page windows can directly affect the other page windows and cause the spreading of the hanging.

If all the system messages inside the Windows system can be sent in the non-blocking mode, then an application program can naturally be prevented from being hung, as long as the different windows are placed in different threads. But as mentioned before, this is in fact not the case. Only certain peripheral messages (such as mouse, keyboard, etc.), and drawing messages (WM_PAINT, WM_NCPAINT, etc.) are sent in the non-blocking mode. Other system messages (such as notice to change size WM_SIZE, notices to change location WM_POSCHANGING and WM_POSCHANGED, etc.) are sent in the blocking mode.

In addition, in FIG. 3, the individual page windows are child windows of "Afx:400000:2008:10011:0:0," and "Afx:400000:2008:10011:0:0" is also a child window of the main frame Window. Thus, in this example, the relationship between the main frame window and the individual page windows is not a direct parent-child relationship. In practice, however, the individual page windows may be direct child windows of the main frame window (i.e., a direct parent-child relationship) or multiple levels of windows may exist between the individual page windows and the main frame window (i.e., an indirect parent-child relationship), etc.

Therefore, in a situation where the page windows corresponding to the individual tabs have a common parent window, as in FIG. 3, when the individual page windows respond to user input messages, the parent window sends (in the blocking mode) system messages to the individual page windows. Only when every system message can be normally processed, the user message interaction can be completed. Therefore, if one page window is hung, when the parent window sends a system message to the hung page window, the hung page window will not be able to return a response message to the parent window, which causes the parent window being in a wait state forever. At this point of time, if operations need to be performed on other page windows, the parent window cannot respond. Thus, the operations on the other page windows cannot be completed, which may even cause the entire application program not being able to run normally.

However, in practice, it might not have a practical significance for the parent window to send a system message to the individual page windows in the blocking mode (the operating system may use the system message, but the application program may not use the system message. In other words, even if the Windows system does not send this system message, the application program can still run correctly). When the individual page windows receive the system message, the individual page windows may only need to return a response message without any other processing.

Figure 4:
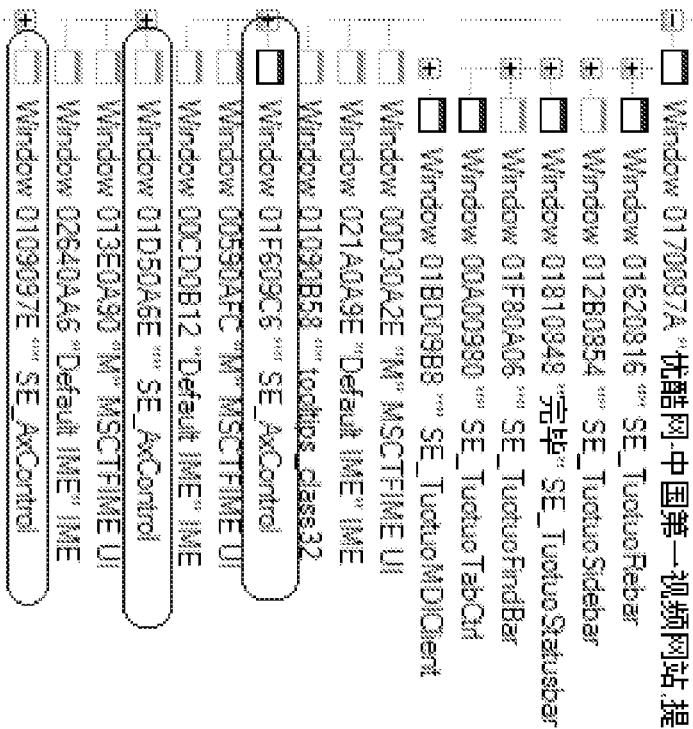
FIG. 4 illustrates an exemplary window structure of a multi-tab browser consistent with the disclosed embodiments.

That is, in fact, if the parent window did not send a system message to the individual page windows, the currently-displayed page window still can handle user input messages. FIG. 4 illustrates an exemplary window structure supporting message interactions in a multi-tab application program without sending system messages related to the input messages.

As shown in FIG. 4, SE_AxControl is the page window corresponding to each tab. It can be seen that, this structure makes the page window corresponding to a tab no longer have a parent window (or have the desktop as the parent window). That is, the window structure is now corresponding to multiple trees of connection relationship instead of a single tree of connection relationship shown in FIG. 3.

Thus, when a page window responds to a user input message, there is no longer a parent window sending messages to the individual page windows, and every page window is independent among one another. Thus, when responding to user input messages, even if a particular page window is hung, the other page windows are not affected. The user can continue browsing the other page windows and may be able to close or reload the hung page window.

For example, if "09C6", "0A6E", "097E" are used to respectively represent page windows "Window 01F609C6""SE_AxControl", "Window 01D50A6E""SE_AxControl", and "Window 0109097E""SE_AxControl", and assuming that the currently-displayed tab corresponds to the page window "09C6," when the user causes the main frame window of the browser becoming the current active window through certain operation (e.g., the user clicks the browser's title bar with a mouse), the main frame window "SE_SogouExploreFrame" can be used to send corresponding messages to "09C6" page window, and the operation can then be directly performed without causing any system message to be generated.

At this point, if the currently-displayed "09C6" is hung, because there is not a common parent window for the "09C6," "0A6E," and "097E" that needs to send a system message to these page windows in the blocking mode in order to facilitate completing the operation on the currently-displayed page window, there is not a common parent window for the "09C6," "0A6E," and "097E" that is not able to process other system messages because the "09C6" cannot respond to the parent window. Thus, when the user needs to perform an operation on the "070C," only the main frame window "SE_SogouExploreFrame" needs to send the input message to the "070C" and the operation on the "070C" can be completed, without involving a parent window sending a system message to the page windows as the child windows in the blocking mode to complete the operation on the page windows. Similarly, operation on the "0774" can also be completed. Thus, page window hanging will no longer spread and the entire application program will not be affected.

Further, the various input message interactions can be performed in either the non-blocking mode or the blocking mode. Of course, if the non-blocking mode is used, when the main frame window sends a message to a page window, the main frame window can return to process messages from other page windows, without waiting for the page window to finish processing the message. Thus, the results may be better. However, the multi-tab application program itself can control which mode is used by the main frame window to send a message to a page window or what message to generate, etc.

In other words, this can be done by designing or modifying the third-party application program (e.g., the browser).

That is, in the situations previously mentioned in FIG. 3, the parent window sending the system message to child windows (pages windows in prior art) in the blocking mode is controlled by the Windows operating system, and not the third-party application program (browser). Thus, the mode for sending the system message cannot be changed by modifying the third-party application program. By changing the page windows from the original form of child windows to the top-level windows, the page windows no longer have a parent window. Thus, there no longer exists a situation where the Windows operating system requires a certain parent window to send a system message to the individual page windows.

It should be noted that, in some operating systems (such as the Windows operating system), there may be situations where a number of top-level windows (A, B, C . . . ) have a common "owner" window O. When the size or display state of one top-level window changes, the owner window O will send WM_POSCHANGING and WM_POSCHANGED messages to other top-level windows (B, C . . . ) in the blocking mode. To avoid the owner window sending the system message to the individual page windows, the owner of the top-level windows is set to empty. Of course, these situations might not exist in other operating systems.

Figure 6:
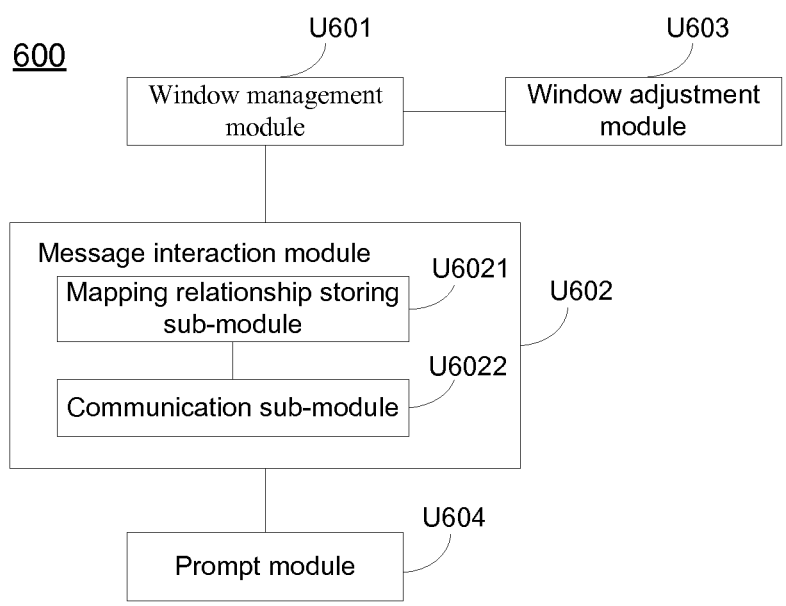
FIG. 6 illustrates an exemplary system for message interactions in a multi-tab application program consistent with the disclosed embodiments.

FIG. 6 illustrates an exemplary system for message interactions in a multi-tab application program consistent with the disclosed embodiments. As shown in FIG. 6, system 600 includes a window management module U601, a message interaction module U602, a window adjustment module U603, and a prompt module U604. Other modules may also be included. These modules may be implemented by software, hardware, or a combination of software and hardware.

Figure 2A:
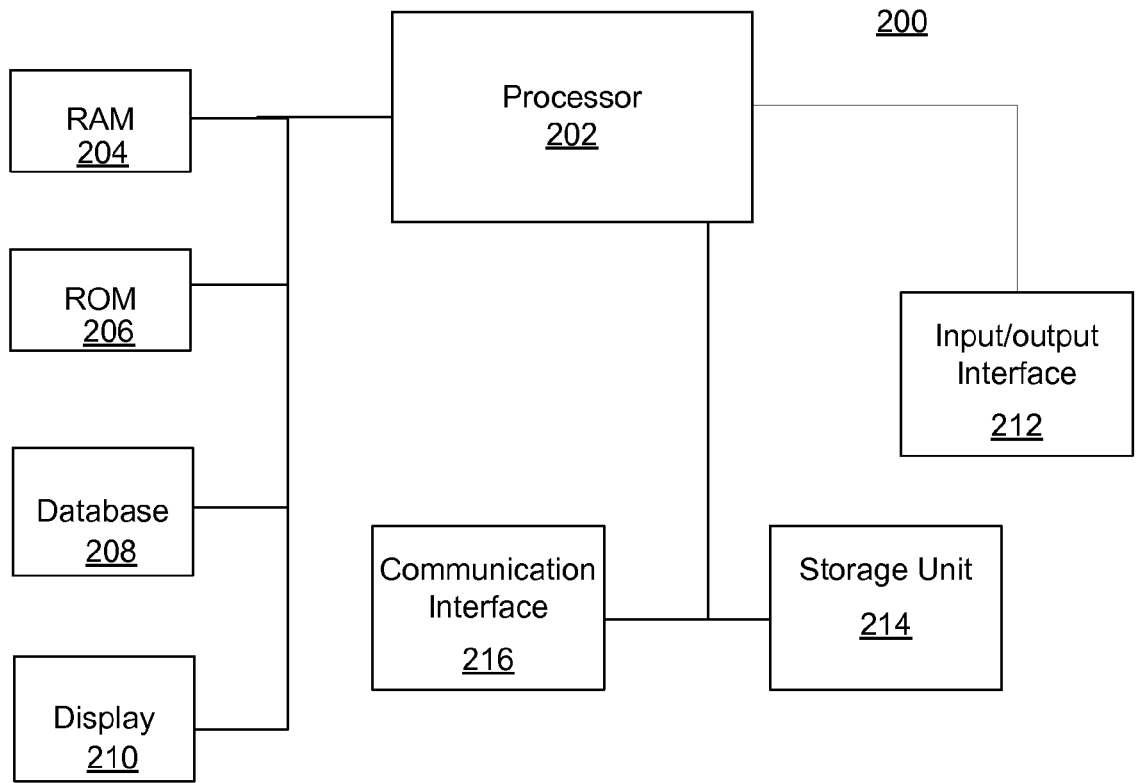
FIG. 2A illustrates a block diagram of an exemplary user computer consistent with the disclosed embodiments.

For example, system 600 may be implemented on any appropriate user computer, including personal computer equipment and the like, or a mobile phone, mobile communications equipment, a personal digital assistant (PDA) and other electronic equipment and computing platforms and software programs. FIG. 2A shows a block diagram of an exemplary user computer 200.

As shown in FIG. 2A, user computer 200 may include a processor 202, a random access memory (RAM) unit 204, a read-only memory (ROM) unit 206, a database 208, a display 210, an input/output interface unit 212, a storage unit 214, and a communication interface 216. Other components may be added and certain devices may be removed without departing from the principles of the disclosed embodiments.

Processor 202 may include any appropriate type of graphic processing unit (GPU), general-purpose microprocessor, digital signal processor (DSP) or microcontroller, and application specific integrated circuit (ASIC), etc. Processor 202 may execute sequences of computer program instructions to perform various processes associated with user computer 200. The computer program instructions may be loaded into RAM 204 for execution by processor 202 from read-only memory 206.

Database 208 may include any appropriate commercial or customized database to be used by user computer 200, and may also include query tools and other management software for managing database 208. Display 210 may include any appropriate computer monitor, such as an LCD monitor. Further, input/output interface 212 may be provided for a user or users to input information into user computer 200 or for the user or users to receive information from user computer 200. For example, input/output interface 212 may include any appropriate input device, such as a remote control, a keyboard, a mouse, a microphone, a video camera or web-cam, an electronic tablet, voice communication devices, or any other optical or wireless input devices. Input/output interface 212 may include any appropriate output device, such as a speaker, or any other output devices.

Storage unit 214 may include any appropriate storage device to store information used by user computer 200, such as a hard disk, a flash disk, an optical disk, a CR-ROM drive, a DVD or other type of mass storage media, or a network storage. Further, communication interface 216 may provide communication connections such that user computer 200 may be accessed remotely and/or communicate with other systems through computer networks or other communication networks via various communication protocols, such as TCP/IP, hyper text transfer protocol (HTTP), etc.

Figure 2B:
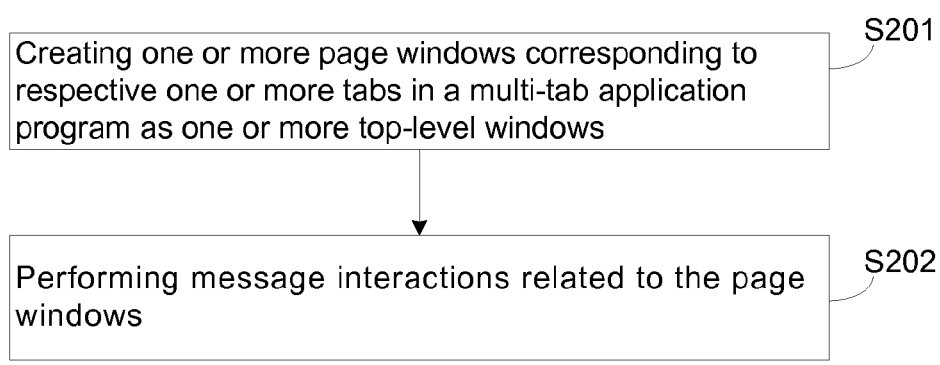
FIG. 2B illustrates an exemplary message interaction process consistent with the disclosed embodiments.

During operation, user computer 104 or system 600 implemented on user computer 104 may perform various processes to realize message interactions in a multi-tab application program. FIG. 2B illustrates an exemplary process for message interactions consistent with the disclosed embodiments.

As shown in FIG. 2B, a method realizing message interactions in a multi-tab application program may include creating one or more page windows corresponding to respective one or more tabs in a multi-tab application program as one or more top-level windows (S201) and performing user message interactions in the top-level windows (S202). Other steps may also be included.

More particularly, also referring back to FIG. 6, window management module U601 may create the page windows corresponding to the tabs in the multi-tab application program as the top-level windows. Because the main frame window of the multi-tab application program is also a top-level window, and the page windows are created as the top-level windows, the page windows and the main frame window are at the same level, all being top-level windows.

That is, the page windows corresponding to the tabs can be made by window management module U601 to have no parent window. Thus, when the page windows respond to user input messages, there is no parent window to send system messages to the page windows in the blocking mode. Therefore, even if a certain page window is hung, other page windows will not be affected and the user experience is enhanced.

Window management module U601 may create a page window as a top-level window from beginning or may change a page window to a top-level window at any time according to the actual needs. For example, when a new tab is created, window management module U601 may create the page window corresponding to the created new tab as a top-level window. Further, in a multi-tab browser, creating the new tab may include two approaches. One approach is to create the new tab when the user double-clicks the tab bar and the page window corresponding to the new tab is blank.

The other approach is to create the new tab automatically by the browser when a certain web page is opened in the page window corresponding to the new tab, normally by clicking a link in the currently-displayed page. This approach may have more significance in a multi-tab document editor. For example, in 'excel,' page window hanging not only can occur during the document editing process, but also can occur when opening an excel document. When an excel document is being opened, if a page window corresponding to a tab is hung and the page window corresponding to the tab was not created as the top-level window, it might be unable to check data in other page windows that were not hung (i.e., hanging of one page may cause the entire document not being able to be opened). Thus, creating the corresponding page window as the top-level window when creating the new tab can prevent this situation from happening.

Further, message interaction module U602 may perform user message interaction among the top-level windows, i.e., message interactions related to the page windows, such as message interactions between the main frame window in the application program and the page windows, now all being the top-level windows.

In addition, in Windows and other operating systems, the individual page windows may still have a common owner, and the owner may also send a system message to the individual page windows. To avoid the owner window sending the system message to the individual page windows, the owner of the top-level windows is set to empty or null. Thus, in Windows and other operating systems, to prevent the owner window of the top-level windows from sending messages to the page windows, window management module U601 may optionally create the page windows corresponding to the tabs in the multi-tab application program as top-level windows having an empty owner.

Because the main frame window or the like may need to send certain messages (e.g., input messages) to the page windows, there is a certain mapping relationship between the main frame window and the page window corresponding to an individual tab. Communication between the main frame window and the page window may be achieved based on this mapping relationship in order to complete message interactions with the user.

In the traditional window structure, the Windows system can automatically create such mapping relationship. The main frame window only needs to use a system function (e.g., GetWindow(CHILD)) to get the page window and then sends a messages to the page window. However, because this traditional window structure is broken down in the present disclosure, the Windows system may be unable to automatically create the mapping relationship between the main frame window and the page window. There is no function to be called to get the page window.

Thus, to achieve the normal communication between the main frame window and the page window, when the page window corresponding to the individual tab is created as a top-level window, message interaction module U602 may create the mapping relationship between the main frame window and the page window, and may also store such mapping relationship. Thus, after the main frame window receives the message from the user, the main frame window can find the corresponding page window based on the pre-stored mapping relationship and then sends the message to the page window.

More specifically, message interaction module U602 may include a mapping relationship storing sub-module U6021 and a communication sub-module U6022. Mapping relationship storing sub-module U6021 may create and store the mapping relationship between the main frame window of the multi-tab application program and the page windows. Communications sub-module U6022 may trigger the main frame window to send a message to a top-level window corresponding to a specific tab, and may also trigger the top-level window to perform a specific operation corresponding to the received message.

The message can be sent in the non-blocking mode. As previously explained, the multi-tab application program can determine the message sending mode, without depending on the operating system. The main frame window can then send messages to the page windows corresponding to the tabs and the page windows can perform corresponding operation.

The page window performs corresponding operation according to the received message. Such operation may include zoom operation, switch operation, or lookup operation, etc. Of course, in the future, it might be possible that the Windows system or other operating systems can, using the window structure described in the embodiments of the present invention, automatically create the mapping relationship between the main frame window and the page window.

Further, as shown in FIG. 6, window adjustment module U603 may adjust the location and size of the page windows such that the page windows match the location and size of the main frame window.

As previously explained, unlike in the traditional structure where the page window corresponding to the tab is a child window of a certain child window of the main frame window, here the main frame window and the page window corresponding to the tab are independent with each other. Thus, the size and location of the main frame window and the page window can be arbitrary. Window adjustment module U603 may adaptively adjust the location and size of the page windows corresponding to the tabs to match the location and size of the main frame window to enable the user to get a better visual effect.

In other words, window adjustment module U603 configures the different page windows and the main frame window such that the browser interface finally shown in front of the user appears the same as the traditional browsers. However, in fact this browser interface is not a single entity, but multiple entities or windows connected together. Such interface provided to the user by the embodiments of the present invention can be called "asynchronous user interface (UI)." This user interface can prevent from happening situations where hanging of one tab page window causes inoperability of the browser frame or other tab page windows.

Figure 5:
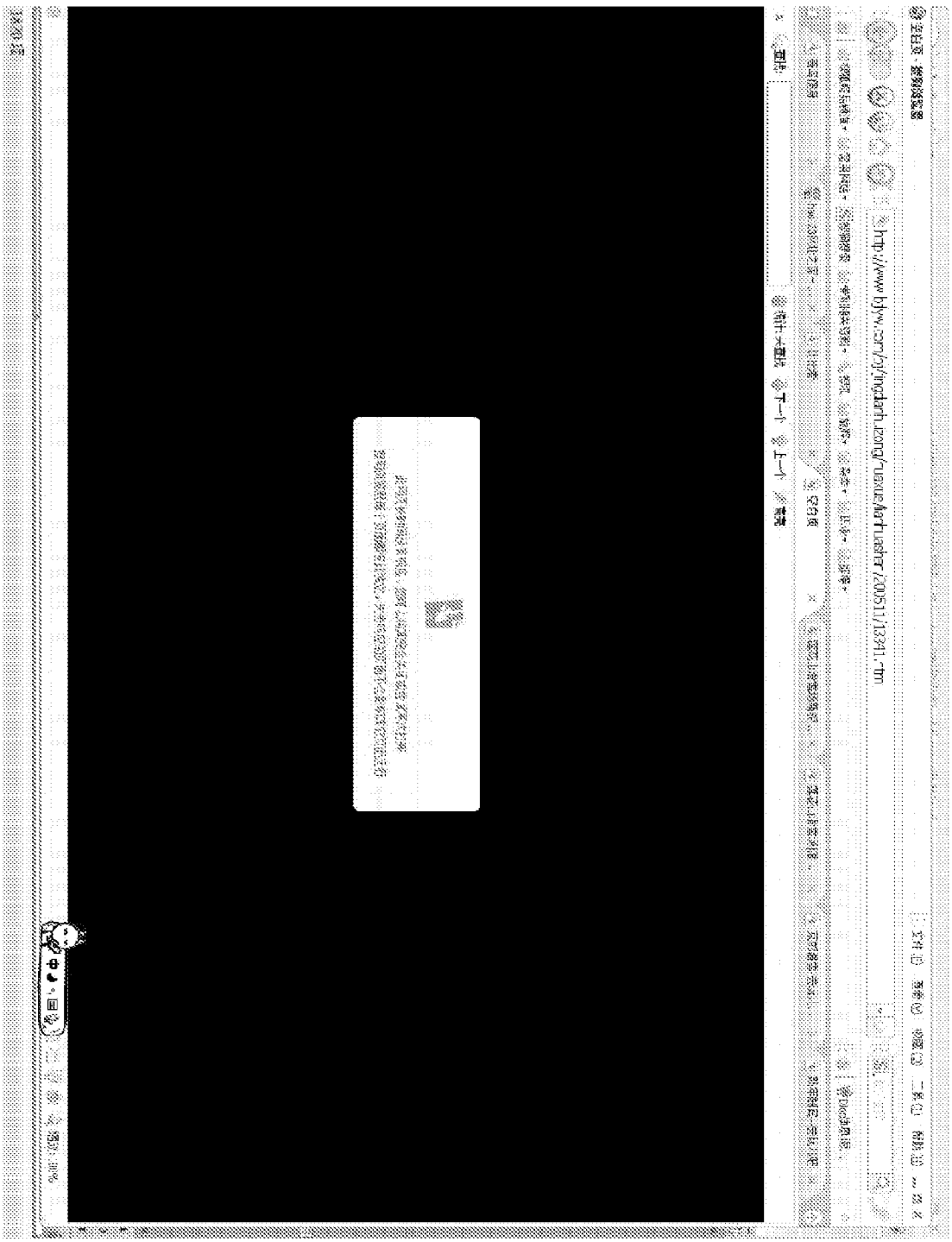
FIG. 5 illustrates an interface during page window hanging.

As shown in FIG. 6, prompt module U604 is also included in system 600 to prompt the user with certain reminding information when a page window corresponding to a certain tab is hung. For example, prompt module U604 may prompt the user to close or reload the page window, etc. FIG. 5 shows an exemplary user prompt displayed at the center of the currently hung window.

That is, window management module U601 or prompt module U604 may determine whether a particular page window is hung. If it is determined that a specific page window is hung, the user can be prompted (informing the user of the occurrence of the hanging of the page window and reminding the user to close or reload the page window) to effectively enhance the user experience. Window management module U601 or prompt module U604 may determine a hung window by performing certain testing. For example, within a period of time (e.g., 5 seconds), if the page window does not process any message sent to the page window, it is considered that the page window may be hung, etc. Other testing may also be used.

Further, system 600 may optionally include a first creation module and a second creation module (not shown). As previously described, if two or more windows belong to a same thread, hanging spreading can happen regardless whether the messages are sent in the blocking mode or the non-blocking mode. To prevent this type of hanging spreading, the first creation module may create the different page windows to belong to different threads to further reduce the occurrence of the hanging spreading. That is, different page windows belong to different threads.

In addition, during a specific message interaction, the main frame window of the multi-tab application program may need to send messages to individual page windows as top-level windows. As previously described, if the main frame window and the page windows belong to a same thread, regardless whether the blocking mode or the non-blocking mode is used to send messages, the hanging spreading between the main frame window and the page windows might still occur. The second creation module may create the main frame window and the page windows corresponding to the tabs in different threads.

That is, the main frame window of the multi-tab application program and each page window belong to the different threads. Thus, because these two windows do not belong to a same thread, when the main frame window needs to send a message to a page window, so long as the message is sent in the non-blocking mode, it will not cause the occurrence of the hanging spreading. Of course, some multi-tab application programs themselves are multi-threaded, i.e., different page windows and the main frame window are already created by different threads. Thus, these multi-tab application programs may no longer need thread-related modifications.

The disclosed systems and methods may provide many advantageous browser and other software applications in a variety of network or client environments, such as in personal computer equipment and the like, mobile phones, mobile communication devices, personal digital assistants (PDAs) and other electronic equipment. For example, by creating the page windows corresponding to tabs in the multi-tab application program as top-level windows, the page windows no longer have a parent window. Thus, when performing message interactions related to the page windows, there will not be a situation where a certain parent window sends system messages to the page windows in the blocking mode. Therefore, the problem of page window hanging spreading caused by sending such system messages can be avoided. Even if one page window is hung, the other page windows will not be affected. That is, operations on the other page windows can be performed normally, without affecting the normal execution of the application program.

What is claimed is:

1. A method for performing message interactions in a multi-tab application program, comprising:
    creating one or more page windows corresponding to respective tabs in the multi-tab application program as one or more top-level windows independent from one another without a parent-child relationship with a main frame window of the multi-tab application program, wherein the one or more page windows are created as the one or more top-level windows at a same level as the main frame window, such that the main frame window does not send a system message to the one or more page windows, wherein the system message is required by an operating system to be sent to each child window of the main frame window in order to complete a user operation with respect to one child window of the main frame window;
    receiving an input message corresponding to a user operation with respect to a particular tab;
    sending, by the main frame window, the input message to one of the page windows corresponding to the particular tab in a non-blocking message sending mode, without sending any associated system message to the page windows, wherein the non-blocking message sending mode includes one of an asynchronous message sending method and a synchronous message sending method with a time-out mechanism;
    continuing, by the main frame window, to handle messages for other page windows regardless whether the one of the page windows is hung.

2. The method according to claim 1, further including:
    creating and storing a mapping relationship between the main frame window and the page windows;
    sending the input message to the one of the page windows based on the mapping relationship; and
    triggering the one page window to perform the user operation corresponding to input message.

3. The method according to claim 1, further including: adjusting location and size of the page windows to match a location and size of the main frame window such that the page windows and the main frame window are integrated.

4. The method according to claim 1, further including:
    determining whether the one of the page windows is hung; and
    when it is determined that the one of the page windows is hung, prompting a user.

5. The method according to claim 1, wherein creating the page windows further includes:
    when creating a new tab in the multi-tab application program, creating the page window corresponding to the new tab as a top-level window.

6. The method according to claim 1, wherein the multi-tab application program includes one of a multi-tab web page browser, a multi-tab document editor, and a multi-tab document reader.

7. The method according to claim 1, wherein:
    the main frame window and the page windows belong to different threads.

8. The method according to claim 1, wherein:
    the page windows belong to different threads.

9. The method according to claim 1, wherein creating the page windows further includes:
    creating the one or more page windows corresponding to the respective tabs in the multi-tab application program as top-level windows with an owner, wherein the owner is a common owner window in the operating system that, when a size or a display state of one top-level window of the top-level windows changes, sends WM_POSCHANGING and WM_POSCHANGED system messages to other top-level windows in a blocking mode, wherein the operating system includes a Windows operating system; and
    setting the owner of the top-level windows to be empty or null, such that the owner does not send the system message to the one or more page windows.

10. A non-transitory computer-readable medium containing executable computer programs, when executed by a computer, performing a method for performing message interactions in a multi-tab application program, the method comprising:
    creating one or more page windows corresponding to respective tabs in the multi-tab application program as one or more top-level windows independent from one another without a parent-child relationship with a main frame window of the multi-tab application program, wherein the one or more page windows are created as the one or more top-level windows at a same level as the main frame window, such that the main frame window does not send a system message to the page windows, wherein the system message is required by an operating system to be sent to each child window of the main frame window in order to complete a user operation with respect to one child window of the main frame window;
    receiving an input message corresponding to a user operation with respect to a particular tab;
    sending, by the main frame window, the input message to one of the page windows corresponding to the particular tab in a non-blocking message sending mode, without sending any associated system message to the page windows, wherein the non-blocking message sending mode includes one of an asynchronous message sending method and a synchronous message sending method with a time-out mechanism; and continuing, by the main frame window, to handle messages for other page windows regardless whether the one of the page windows is hung.

11. The non-transitory computer-readable medium according to claim 10, further including:

creating and storing a mapping relationship between the main frame window and the page windows;

sending the input message to the one of the page windows based on the mapping relationship; and triggering the one page window to perform the user operation corresponding to input message.

12. The non-transitory computer-readable medium according to claim 10, further including:

adjusting location and size of the page windows to match a location and size of the main frame window such that the page windows and the main frame window are integrated.

13. The non-transitory computer-readable medium according to claim 10, further including:

determining whether the one of the page windows is hung; and when it is determined that the one of the page windows is hung, prompting a user.

14. The non-transitory computer-readable medium according to claim 10, wherein creating the page windows further includes:

when creating a new tab in the multi-tab application program, creating the page window corresponding to the new tab as a top-level window.

15. The non-transitory computer-readable medium according to claim 10, wherein the multi-tab application program includes one of a multi-tab web page browser, a multi-tab document editor, and a multi-tab document reader.

16. The non-transitory computer-readable medium according to claim 10, wherein:

the main frame window and the page windows belong to different threads.

17. The non-transitory computer-readable medium according to claim 10, wherein:

the page windows belong to different threads.

18. The non-transitory computer-readable medium according to claim 10, wherein creating the page windows further includes:

creating the one or more page windows corresponding to the respective tabs in the multi-tab application program as top-level windows with an owner, wherein the owner is a common owner window in the operating system that, when a size or a display state of one top-level window of the top-level windows changes, sends WM_POSCHANGING and WM_POSCHANGED system messages to other top-level windows in a blocking mode, wherein the operating system includes a Windows operating system; and setting the owner of the top-level windows to be empty or null, such that the owner does not send the system message to the one or more page windows.

* * * * *